(12) United States Patent
Pan

(10) Patent No.: US 7,376,230 B2
(45) Date of Patent: May 20, 2008

(54) MOBILE PHONE AND BATTERY-RELEASE DEVICE

(75) Inventor: Jiung-Cheng Pan, Tainan (TW)

(73) Assignee: BENQ Corporation, Taoyuan (TW)

( * ) Notice: Subject to any disclaimer, the term of this patent is extended or adjusted under 35 U.S.C. 154(b) by 831 days.

(21) Appl. No.: 10/950,337

(22) Filed: Sep. 24, 2004

(65) Prior Publication Data

US 2005/0070346 A1 Mar. 31, 2005

(30) Foreign Application Priority Data

Sep. 25, 2003 (TW) .............................. 92217214 U

(51) Int. Cl.
*H04M 1/00* (2006.01)
*H04M 9/00* (2006.01)

(52) U.S. Cl. .............................. 379/433.08; 455/575.1; 379/433.11

(58) Field of Classification Search ........... 379/433.01, 379/433.05, 433.08, 428.01, 433.11; 455/90.3, 455/575.1; 292/87; 429/96, 97, 100; 320/110–115
See application file for complete search history.

(56) References Cited

U.S. PATENT DOCUMENTS

| 6,975,842 | B2 * | 12/2005 | Chen | 455/90.3 |
| 7,313,410 | B2 * | 12/2007 | Tsai | 455/550.1 |
| 2003/0003949 | A1 * | 1/2003 | Park | 455/550 |
| 2005/0130695 | A1 * | 6/2005 | Korhonen et al. | 455/550.1 |
| 2006/0209177 | A1 * | 9/2006 | Kim et al. | 348/14.01 |
| 2006/0226804 | A1 * | 10/2006 | Lu | 320/107 |

* cited by examiner

*Primary Examiner*—Curtis Kuntz
*Assistant Examiner*—Tuan D Nguyen
(74) *Attorney, Agent, or Firm*—Quintero Law Office

(57) ABSTRACT

A mobile phone and a battery-release device. The mobile phone includes a body, a positioning device, and a battery. The positioning device includes a magnet. The positioning device is disposed in the body in a manner such that it moves between a first position and a second position. The battery is disposed in the body in a detachable manner, and includes a moveable engaging member. When the positioning device is in the first position, the engaging member is attracted by the magnet so that the battery is fixed in the body. When the positioning device is in the second position, the engaging member is not attracted by the magnet so that the battery is separated from the body.

19 Claims, 3 Drawing Sheets

MOBILE PHONE AND BATTERY-RELEASE DEVICE

BACKGROUND

The invention relates to a mobile phone, and in particular, to a battery-releasing device allowing the mobile phone to be more compact.

In a mobile phone, a battery thereof is normally released by a battery knob. When the battery knob is pushed, the battery can be removed. Since the battery knob is moved in a longitudinal direction of the mobile phone, requisite longitudinal space is required. However, since overall sizes of mobile phones are reduced recently, working space for the battery knob may be restricted.

FIG. 1 is a schematic view of a mobile phone 10 with a conventional battery-releasing device. The mobile phone 10 includes a body 11, a battery 12, and a positioning device 13. The body 11 includes a connector 111. The positioning device 13 is disposed in the body 11, and includes a knob 131 and a spring 132. When the battery 12 is inserted into the body 11, it abuts the knob 131 so that the knob 131 is pushed outward as shown by arrow O in FIG. 1. The knob 131 is returned to its original position by the spring 132 so that battery 12 is fixed by the knob 131 in a thickness direction. To release the battery 12, the knob 131 is pushed outward to separate from a concave portion 121 of the battery 12. At this time, the battery 12 is lifted by the connector 111 to be removed.

As stated, the required longitudinal travel distance of the knob limits reduction of size of the mobile phone.

SUMMARY

In view of this, the invention provides a mobile phone with improved arrangement of inner space by a compact battery-releasing device.

Another purpose of the invention is to provide a battery-releasing device that can optimize inner space of an electronic apparatus.

Accordingly, the invention provides a mobile phone including a body, a positioning device, and a battery. The positioning device includes a magnet, and is disposed in the body in a manner such that it moves between a first position and a second position. The battery is disposed in the body in a detachable manner, and includes an engaging member. The engaging member moves between a third position and a fourth position. When the positioning device is in the first position, the engaging member is attracted by the magnet to the third position to fix the battery in the body. When the positioning device is in the second position, the engaging member is not attracted by the magnet to be located in the fourth position so that the battery is separated from the body.

In a preferred embodiment, the body includes a protrusion abutting the battery and the engaging member in the third position.

In another preferred embodiment, the positioning device further includes a knob and a first elastic member. The magnet is disposed in the knob. When the positioning device is in the first position, the knob is exposed by the body. The first elastic member may be a compression spring, and connects the knob and the body to keep the positioning device in the first position.

Furthermore, the battery includes a housing and a second elastic member. The engaging member is disposed in the housing. The second elastic member may be a tension spring, and connects the housing and the engaging member to keep the engaging member in the fourth position. When the engaging member is in the third position, the engaging member is exposed by the housing.

It is noted that magnetic force, applied to the engaging member by the magnet, exceeds the pulling force, applied to the engaging member by the second elastic member, when the positioning device is in the first position.

In another preferred embodiment, the body includes a first connector, and the battery includes a second connector corresponding to the first connector. The battery is electrically connected to the body by the first connector contacting the second connector. When the positioning device is in the second position, the battery is elevated by the first connector.

It is understood that the engaging member is a metallic pin.

In the invention, a battery-releasing device for an electronic apparatus is provided. The electronic apparatus includes a body and a battery, and the battery-releasing device includes a positioning device and an engaging member. The positioning device includes a magnet, and is disposed in the body in a manner such that it moves between a first position and a second position. The engaging member is disposed in the battery in a manner such that it moves between a third position and a fourth position. When the positioning device is in the first position, the engaging member is attracted by the magnet to the third position to fix the battery in the body. When the positioning device is in the second position, the engaging member is not attracted by the magnet to be located in the fourth position so that the battery is separated from the body.

BRIEF DESCRIPTION OF THE DRAWINGS

The present invention can be more fully understood by reading the subsequent detailed description and examples with references made to the accompanying drawings, wherein:

FIG. 3b is a cross section along a line A-A in FIG. 3a;

DETAILED DESCRIPTION

Figure 1:
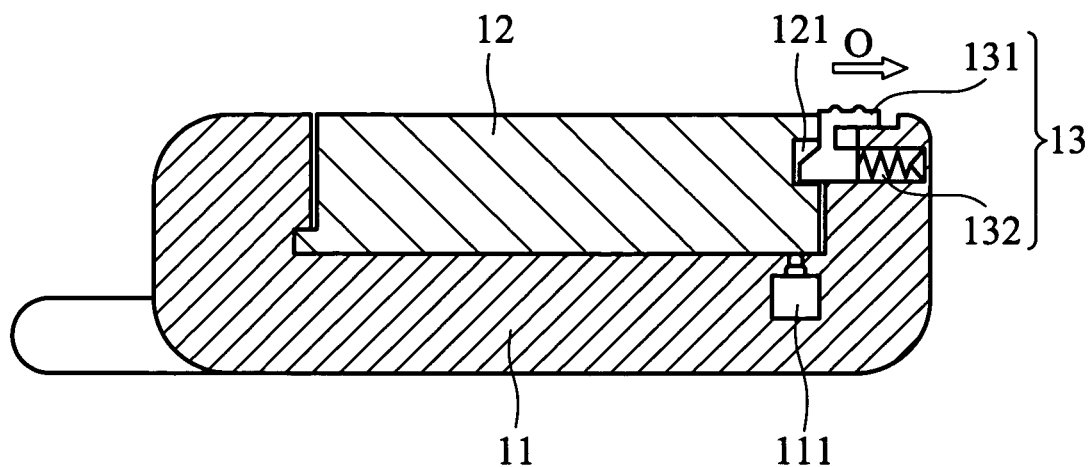
FIG. 1 is a schematic view of a conventional mobile phone.
Figure 2:
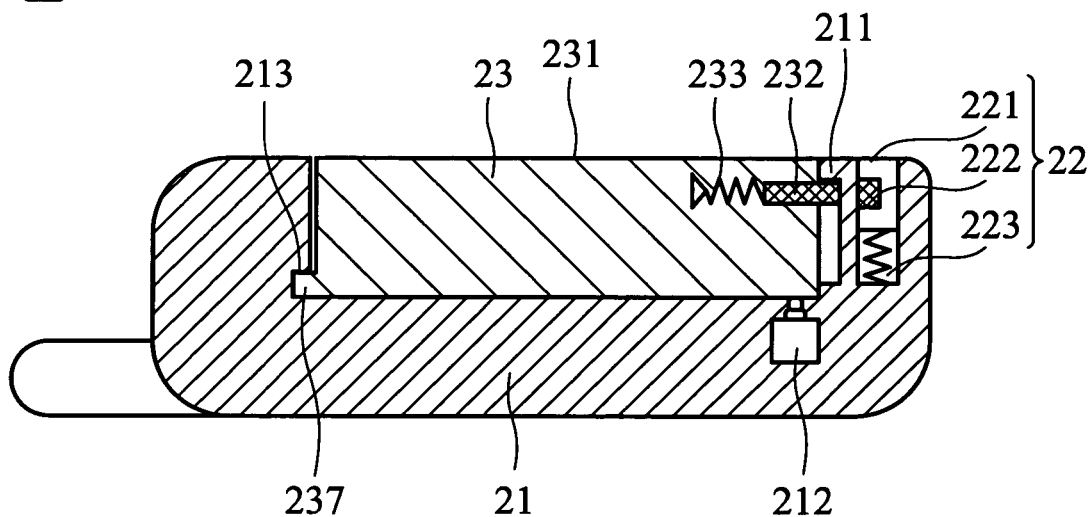
FIG. 2 is a schematic view of a mobile phone as disclosed in the invention.

Referring to FIG. 2, a mobile phone 20, as disclosed in the invention, includes a body 21, a positioning device 22, and a battery 23. The body 21 is a basic component of the mobile phone 20, and includes basic devices thereof. Since the basic devices are conventional elements, their description is omitted. The body 21 is formed with a protrusion 211 at one side, and a concave portion 213 at the other side opposite to the protrusion 211. Additionally, the body 21 includes a first connector 212 in its bottom portion.

The positioning device 22 includes a knob 221, a magnet 222, and a first elastic member 223, and is disposed in the body 21 in a manner such that it moves between an initial position (shown in FIG. 2 and hereinafter referred to as a first position) and a compressed position (shown in FIG. 5 and hereinafter referred to as a second position). When the positioning device 22 is in the first position, the knob 221 is exposed by the body 21, for convenient manipulation. The magnet 222 is disposed in the knob 221, and is moved along with the knob 221. The first elastic member 223 may be a compression spring, and connects the knob 221 and the body 21 to keep the knob 221 of the positioning device 22 in the first position.

Figure 3A:
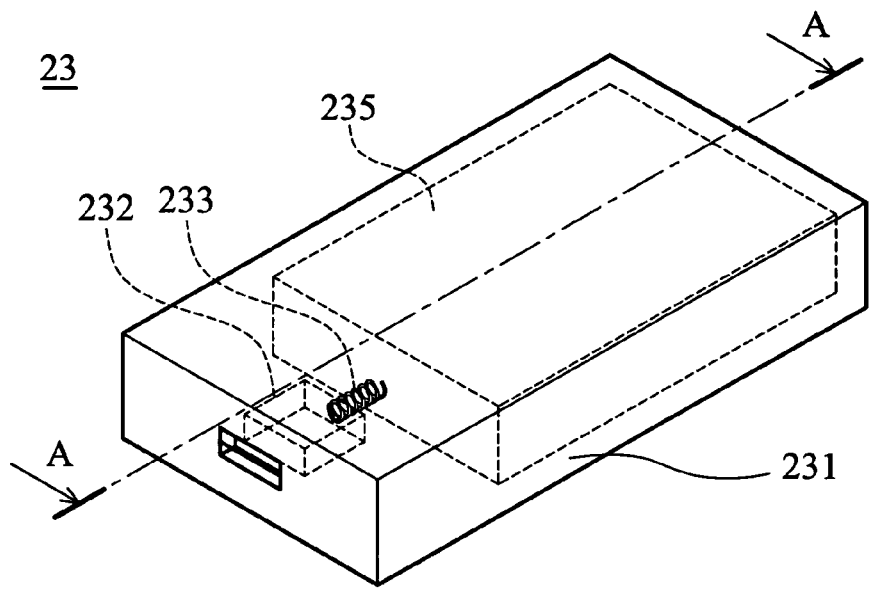
FIG. 3a is a schematic view of a battery in FIG. 2.
Figure 3B:
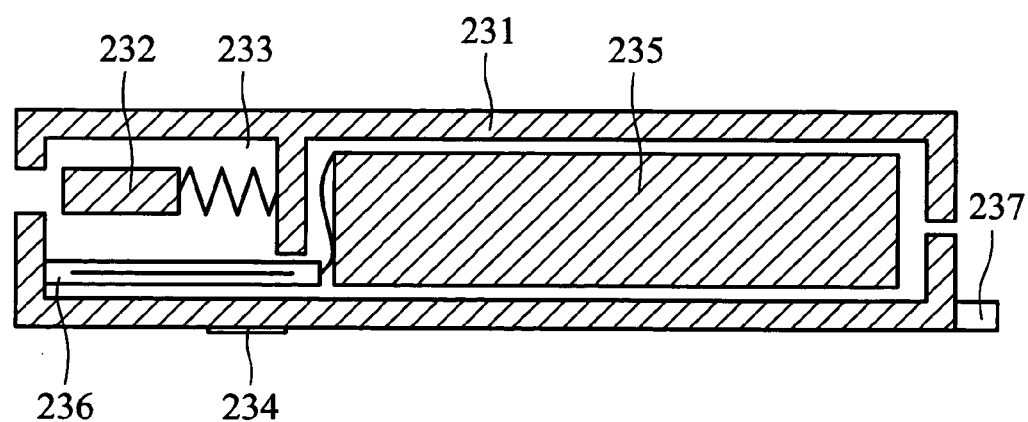

The battery 23 is disposed in the body 21 in a detachable manner. As shown in FIG. 3a and FIG. 3b, the battery 23 includes a housing 231, an engaging member 232, a second elastic member 233, a second connector 234, a battery body 235, and a printed circuit board 236. The housing 231 encloses the other devices of the battery 231 therein, and is formed with a block 237 at one side.

Figure 4:
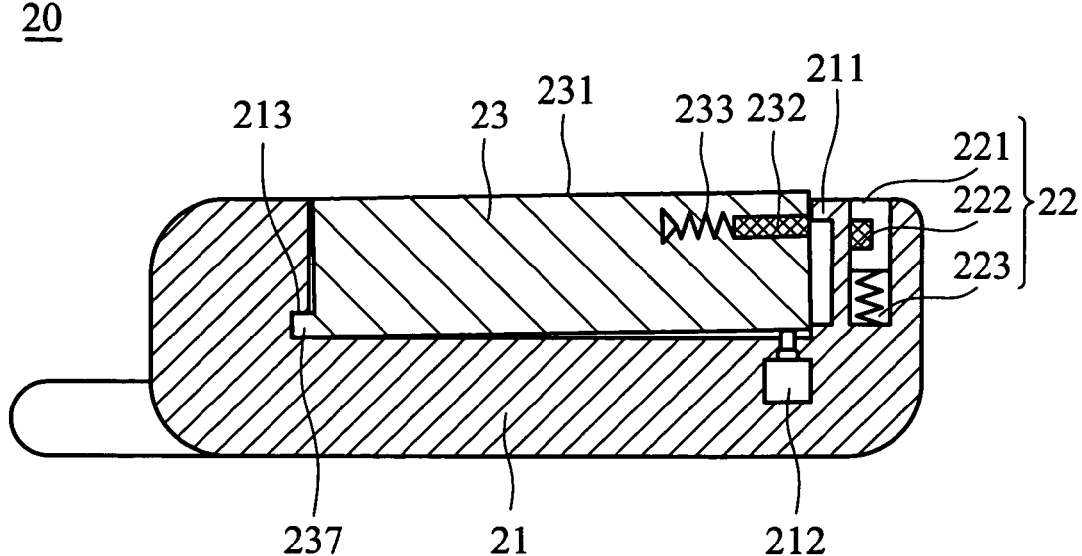
FIG. 4 is a schematic view of the assembly between the battery and a body in FIG. 2.

The engaging member 232 is disposed in the housing 231 in a manner such that it can move between an attracted position (shown in FIG. 2 and hereinafter referred to as a third position) and an initial position (shown in FIG. 4 and hereinafter referred to as a fourth position). When the engaging member 232 is in the third position, it is exposed by the housing 231. It is understood that the engaging member 232 may be a metallic pin.

The second elastic member 233 may be a tension spring, and is disposed in the housing 231. Additionally, the second elastic member 233 connects the housing 231 and the engaging member 232 to keep the engaging member 232 in the fourth position. It is noted that the magnetic force, applied to the engaging member 232 by the magnet 222, is larger than the pulling force, applied to the engaging member 232 by the second elastic member 233, when the positioning device 22 is in the first position and the battery 23 is located inside the body 21. Thus, the engaging member 232 in the third position can abut by the protrusion 211 of the body 21 in its top portion.

The second connector 234 corresponds to the first connector 212 of the body 21. The battery 23 can be electrically connected to the body 21 by the first connector 212 contacting the second connector 234. The battery body 235 and the printed circuit board are basic components of the battery 23, and their description is omitted.

The structure of the mobile phone 20 is described as stated above, and assembly/disassembly of the battery 23 is described in the following.

To seat the battery 23 into the body 21, the block 237 on one side of the battery 23 firstly engages with the concave portion 213 of the body 21. At this time, the other side of the battery 23 abuts the protrusion 211 of the body 21 as shown in FIG. 4. The side, abutting the protrusion 211, of the battery 23 is then pushed downward until the engaging member 232 of the battery 23 faces the magnet 222 of the positioning device 22 in the first position. At this time, the engaging member 232 is moved to the third position by the magnetic force of the magnet 222 as shown in FIG. 2. Since the engaging member 232 abuts the protrusion 211 in its top portion, the battery 23 is fixed in the body 21.

Figure 5:
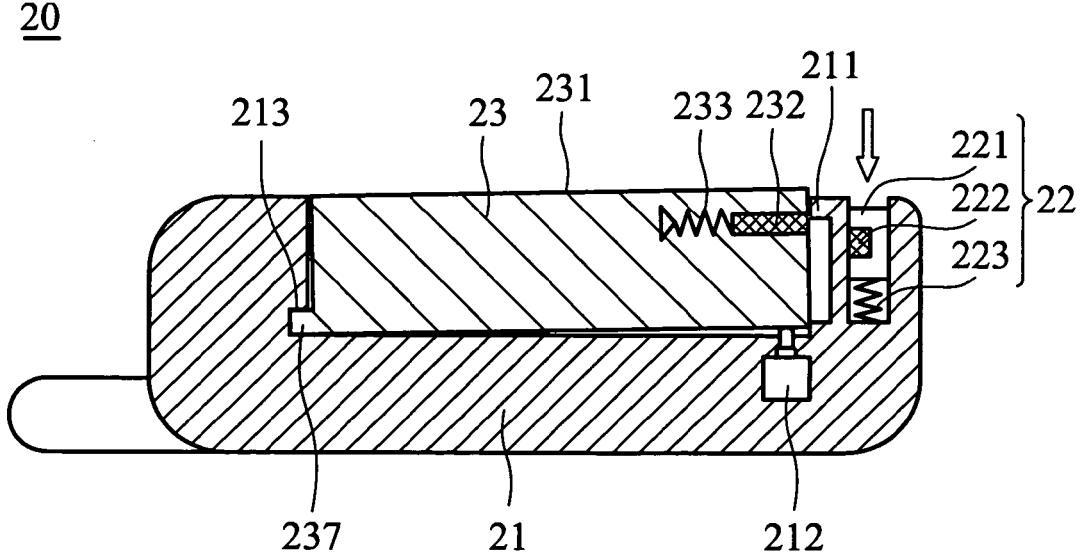
FIG. 5 is a schematic view of the disassembly between the battery and the body.

To release the battery 23 from the body 21, the knob 221 of the positioning device 22 is pushed downward to the second position as shown in FIG. 5. Since the magnet 222 is away from the engaging member 232, the engaging member 232 returns to the fourth position by the pulling force of the second elastic member 233. Since the engaging member 232 moves into the housing 231 and not abutted by the protrusion 211, the battery 23 is elevated by the first connector 212 to be separated from the body 21.

It is understood that the operation of the invention is to attract the engaging member by means of the magnetic force of the magnet. As long as the engaging member can be moved by the magnet to release the battery, the movement of the knob is not limited to the directions shown in the figures. For example, the knob can be moved in a lateral direction to move the magnet.

As stated, since the knob of the positioning device moves in a thickness direction of the mobile phone that is perpendicular to the surface thereof, space inside the mobile phone can be more efficiently utilized. Compared with the conventional mobile phone, the mobile phone of the invention can be more compact.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile phone comprising:
   a body;
   a positioning device, including a magnet, disposed in the body in a manner such that the positioning device moves between a first position and a second position; and
   a battery, disposed in the body in a detachable manner, including an engaging member, wherein the engaging member moves between a third position and a fourth position, the engaging member is attracted by the magnet to be located in the third position to fix the battery in the body when the positioning device is in the first position, and the engaging member is not attracted by the magnet to be located in the fourth position so that the battery is separated from the body when the positioning device is in the second position.

2. The mobile phone as claimed in claim 1, wherein the body includes a protrusion abutting the battery and the engaging member in the third position.

3. The mobile phone as claimed in claim 1, wherein the positioning device further comprises:
   a knob in which the magnet is disposed; and
   a first elastic member connecting the knob and the body to keep the positioning device in the first position.

4. The mobile phone as claimed in claim 3, wherein the knob is exposed by the body when the positioning device is in the first position.

5. The mobile phone as claimed in claim 3, wherein the first elastic member is a compression spring.

6. The mobile phone as claimed in claim 1, wherein the battery further comprises:
   a housing in which the engaging member is disposed; and
   a second elastic member connecting the housing and the engaging member to keep the engaging member in the fourth position.

7. The mobile phone as claimed in claim 6, wherein the engaging member is exposed by the housing when the engaging member is in the third position.

8. The mobile phone as claimed in claim 6, wherein the second elastic member is a tension spring.

9. The mobile phone as claimed in claim 6, wherein the magnetic force, applied to the engaging member by the magnet, exceeds the pulling force, applied to the engaging member by the second elastic member, when the positioning device is in the first position.

10. The mobile phone as claimed in claim 1, wherein the body includes a first connector, the battery includes a second connector corresponding to the first connector, and the battery is electrically connected to the body by the first connector contacting the second connector.

11. The mobile phone as claimed in claim 10, wherein the battery is elevated by the first connector when the positioning device is in the second position.

12. The adjustable support as claimed in claim 1, wherein the engaging member is a metallic pin.

13. A battery-releasing device for an electronic apparatus, wherein the electronic apparatus includes a body and a battery, and the battery-releasing device comprises:

a positioning device, including a magnet, disposed in the body in a manner such that the positioning device moves between a first position and a second position; and an engaging member disposed in the battery in a manner such that the engaging member moves between a third position and a fourth position, wherein the engaging member is attracted by the magnet to be located in the third position to fix the battery in the body when the positioning device is in the first position, and the engaging member is not attracted by the magnet to be located in the fourth position so that the battery is separated from the body when the positioning device is in the second position.

14. The battery-releasing device as claimed in claim 13, wherein the positioning device further comprises:

a knob in which the magnet is disposed; and a first elastic member connecting to the knob to keep the positioning device in the first position.

15. The battery-releasing device as claimed in claim 14, wherein the first elastic member is a compression spring.

16. The battery-releasing device as claimed in claim 13, further comprising a second elastic member connecting to the engaging member to keep the engaging member in the fourth position.

17. The battery-releasing device as claimed in claim 16, wherein the second elastic member is a tension spring.

18. The battery-releasing device as claimed in claim 16, wherein the magnetic force, applied to the engaging member by the magnet, exceeds the pulling force, applied to the engaging member by the second elastic member, when the positioning device is in the first position.

19. The battery-releasing device as claimed in claim 13, wherein the engaging member is a metallic pin.

* * * * *